(12) United States Patent
Awad Alla et al.

(10) Patent No.: US 10,836,259 B2
(45) Date of Patent: Nov. 17, 2020

(54) VEHICLE ELECTRICAL SYSTEM WITH ISOLATION CIRCUIT

(71) Applicant: Ford Global Technologies, LLC, Dearborn, MI (US)

(72) Inventors: Michael Adel Awad Alla, Novi, MI (US); Mathew A. Boesch, Plymouth, MI (US); Sami Dagher, Dearborn, MI (US); Ray Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 146 days.

(21) Appl. No.: 16/032,300

(22) Filed: Jul. 11, 2018

(65) Prior Publication Data
US 2020/0016979 A1    Jan. 16, 2020

(51) Int. Cl.
| | |
|---|---|
| *B60R 16/03* | (2006.01) |
| *H02H 7/22* | (2006.01) |
| *H02H 7/26* | (2006.01) |
| *B60L 3/00* | (2019.01) |
| *B60R 16/023* | (2006.01) |
| *B60K 6/22* | (2007.10) |
| *H02J 7/00* | (2006.01) |

(52) U.S. Cl.
CPC ............ *B60L 3/00* (2013.01); *B60R 16/0238* (2013.01); *B60K 6/22* (2013.01); *B60L 2210/10* (2013.01); *B60Y 2200/91* (2013.01); *B60Y 2200/92* (2013.01); *H02H 7/22* (2013.01); *H02H 7/26* (2013.01); *H02J 7/0016* (2013.01)

(58) Field of Classification Search
CPC .... B60L 3/00; B60L 2210/10; B60R 16/0238; B60R 16/03; B60Y 2200/92; B60Y 2200/91; B60K 6/22; H02H 7/26; H02H 7/22; H02J 7/00; H02J 7/0016
See application file for complete search history.

(56) References Cited

U.S. PATENT DOCUMENTS

| | | | |
|---|---|---|---|
| 4,419,588 A * | 12/1983 | Goiset ........................ | H02J 9/06 307/9.1 |
| 7,545,121 B2 | 6/2009 | Bolduc | |
| 8,552,686 B2 | 10/2013 | Jung et al. | |
| 8,884,460 B2 | 11/2014 | Wagner | |
| 2010/0087961 A1* | 4/2010 | Velez ........................ | H02J 7/0063 700/292 |
| 2011/0186366 A1* | 8/2011 | Heller ........................ | B60L 7/16 180/65.1 |
| 2012/0053766 A1* | 3/2012 | Ham ........................ | B60L 58/31 701/22 |

FOREIGN PATENT DOCUMENTS

| | | |
|---|---|---|
| CN | 105857102 A | 8/2016 |
| JP | 2008302825 A | 12/2008 |
| JP | 2010130877 A | 6/2010 |

\* cited by examiner

*Primary Examiner* — Rexford N Barnie
*Assistant Examiner* — Terrence R Willoughby
(74) *Attorney, Agent, or Firm* — Frank A. MacKenzie; Bejin Bieneman PLC

(57) ABSTRACT

An electrical system for a vehicle includes a DC/DC converter electrically connected to a high-voltage power source and a first bus, a second bus electrically connected to a second low-voltage power source, and an isolation circuit electrically connected to the first and second buses. The isolation circuit permits current flow in only one direction from the first bus to the second bus.

18 Claims, 4 Drawing Sheets

VEHICLE ELECTRICAL SYSTEM WITH ISOLATION CIRCUIT

BACKGROUND

Hybrid-electric, electric, and conventional (internal-combustion engine) vehicles typically include a power system for supplying power to various loads. The power system typically includes a low-voltage battery, e.g., 12 or 48 volts, which can supply energy to the loads. In a hybrid-electric vehicle, the power system includes a DC/DC converter that supplies power to the loads unless the power demanded by the loads exceeds the capacity of the DC/DC converter, in which case the low-voltage battery supplies the loads.

DETAILED DESCRIPTION

Figure 1:
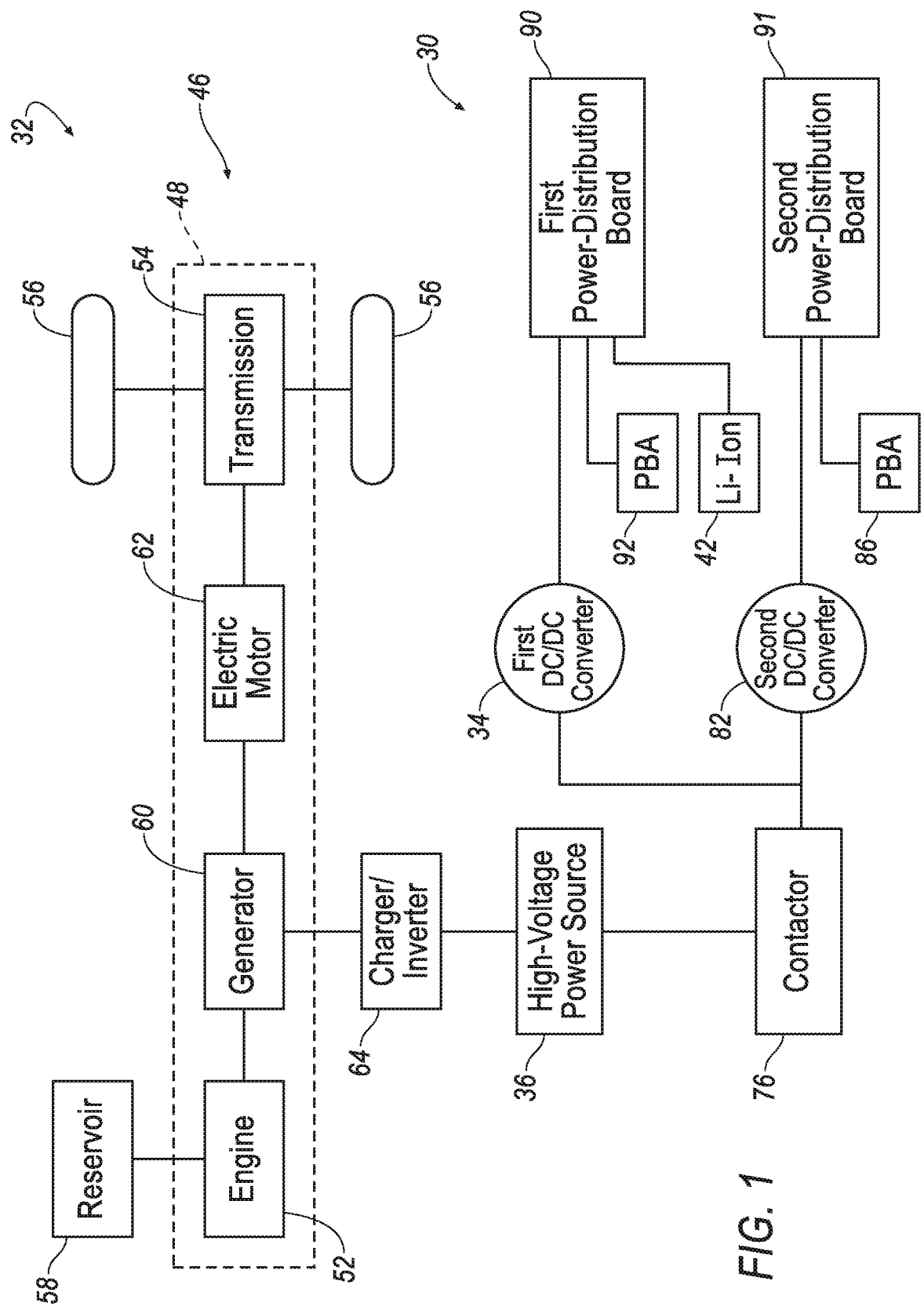
FIG. 1 is a block diagram of an example vehicle including a propulsion system.

An electrical system for a vehicle includes a DC/DC converter electrically connected to a high-voltage power source and a first bus, a second bus electrically connected to a low-voltage power source, and an isolation circuit electrically connected to the first and second buses. The isolation circuit permits current flow in only one direction from the first bus to the second bus.

The isolation circuit may include a diode including a cathode and an anode electrically connected to the first bus.

The isolation circuit may be a diode including an anode electrically connected to the first bus, and a cathode electrically connected to the second bus.

The isolation circuit may include a switch electrically connecting the first and second buses, and the switch may be configured to open when one of the first and second buses is short-circuited. The switch may be a relay including a control lead electrically connected to the one of the first and second buses. The electrical system may further include a diode electrically connecting the control lead and the one of the first and second buses.

The switch may be a first switch configured to open when the first bus is short-circuited, the electrical system may further include a second switch electrically connecting the first and second buses, and the second switch may be configured to open when the second bus is short-circuited. The first switch may be a first relay including a first control lead electrically connected to the first bus, and the second switch may be a second relay including a second control lead electrically connected to the second bus. The electrical system may further include a first diode electrically connecting the first control lead and the first bus, and a second diode electrically connecting the second control lead and the second bus.

The first and second switches may be arranged in series between the first and second buses.

The low-voltage power source may be a second low-voltage power source, and the electrical system may further include a first low-voltage power source electrically connected to the first bus.

The electrical system may further include a plurality of loads electrically connected to the first bus.

The electrical system may further include a plurality of loads electrically connected to the second bus. The loads may include a contactor for the high-voltage power source. The contactor may electrically connect the high-voltage power source to the first bus. The loads may include a control module programmed to operate the contactor.

An electrical system for a vehicle includes a DC/DC converter electrically connected to a high-voltage power source and a first bus, a second bus electrically connected to a low-voltage power source and the first bus, and means for isolating the second bus from the first bus in response to the first bus short-circuiting.

The electrical system may further include means for isolating the second bus from the first bus in response to the second bus short-circuiting.

An electrical system 30 for a vehicle 32 includes a first DC/DC converter 34 electrically connected to a high-voltage power source 36 and a first bus 38, a second bus 40 electrically connected to a second low-voltage power source 42, and an isolation circuit 44 electrically connected to the first and second buses 38, 40. (The adjectives "first" and "second" are used throughout this document as identifiers and are not intended to signify importance or order.) The isolation circuit 44 permits current flow in only one direction from the first bus 38 to the second bus 40.

The electrical system 30 provides improved reliability for the vehicle 32. In the event that the first bus 38 experiences a short circuit, the second bus 40 can still be supplied with power by the second low-voltage power source 42. Whatever systems are connected to the second bus 40 can thus continue to operate even after an electrical failure. The vehicle 32 may be able to perform, e.g., a minimal risk condition even after an electrical failure instead of possibly becoming immediately disabled. For purposes of this disclosure, that term has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, *Automated Driving Systems 2.0: A Vision for Safety*, at 26 (citing SAE International J3016, International Taxonomy and Definitions for Terms Related to Driving Automation Systems for On-Road Motor Vehicles (J3016:Sept2016)).) For example, the minimal risk condition may specify initiating a handover to the human driver or autonomously driving the vehicle 32 to a halt at a roadside, i.e., stopping the vehicle 32 outside active lanes of traffic.

With reference to FIG. 1, the vehicle 32 may be an autonomous or semi-autonomous vehicle. A vehicle computer can be programmed to operate the vehicle 32 independently of the intervention of a human driver, completely or to a lesser degree. The vehicle computer may be programmed to operate a propulsion 46, brake system, steering system, and/or other vehicle systems. For the purposes of this disclosure, autonomous operation means the vehicle computer controls the propulsion 46, brake system, and steering system without input from a human driver; semi-autonomous operation means the vehicle computer controls one or two of the propulsion 46, brake system, and steering system and a human driver controls the remainder; and nonautonomous operation means a human driver controls the propulsion 46, brake system, and steering system.

The propulsion 46 of the vehicle 32 generates energy and translates the energy into motion of the vehicle 32. In particular, the propulsion 46 may be hybrid propulsion. The propulsion 46 may include a powertrain 48 in any hybrid arrangement, e.g., a series-hybrid powertrain (as shown in FIG. 1), a parallel-hybrid powertrain, a power-split (series-parallel) hybrid powertrain, etc. The propulsion 46 can include an electronic control unit (ECU) or the like that is in communication with and receives input from the vehicle computer and/or a human driver, e.g., a hybrid-powertrain control module 50. The human driver may control the propulsion 46 via, e.g., an accelerator pedal and/or a gearshift lever.

The propulsion 46 includes the powertrain 48 that transmits power from an engine 52, from the high-voltage power source 36, or from both the engine 52 and the high-voltage power source 36, to a transmission 54 and ultimately to wheels 56 of the vehicle 32. The engine 52 is an internal-combustion engine and may contain cylinders that serve as combustion chambers that convert fuel from a reservoir 58 to rotational kinetic energy. A generator 60 may receive the rotational kinetic energy from the engine 52. The generator 60 converts the rotational kinetic energy into electricity, e.g., alternating current, and powers an electric motor 62. A charger/inverter 64 may convert the output of the generator 60, e.g., the alternating current, into high-voltage direct current to supply the high-voltage power source 36. For the purposes of this disclosure, "high voltage" is defined as at least 60 volts direct current or at least 30 volts alternating current. For example, the high-voltage direct current may be on the order of 400 volts. The charger/inverter 64 controls how much power is supplied from the high-voltage power source 36 to the generator 60 of the powertrain 48. The electric motor 62 may convert the electricity from the generator 60 into rotational kinetic energy transmitted to the transmission 54. The transmission 54 transmits the kinetic energy via, e.g., a drive axle to the wheels 56, while applying a gear ratio allowing different tradeoffs between torque and rotational speed.

The high-voltage power source 36 produces a voltage of at least 60 volts direct current, e.g., on the order of 400 volts direct current. The high-voltage power source 36 may be any type suitable for providing high-voltage electricity for operating the vehicle 32, e.g., a battery such as lithium-ion or lead-acid, a capacitor, etc. The high-voltage power source 36 is electrically coupled to the powertrain 48 via the charger/inverter 64.

Figure 2:
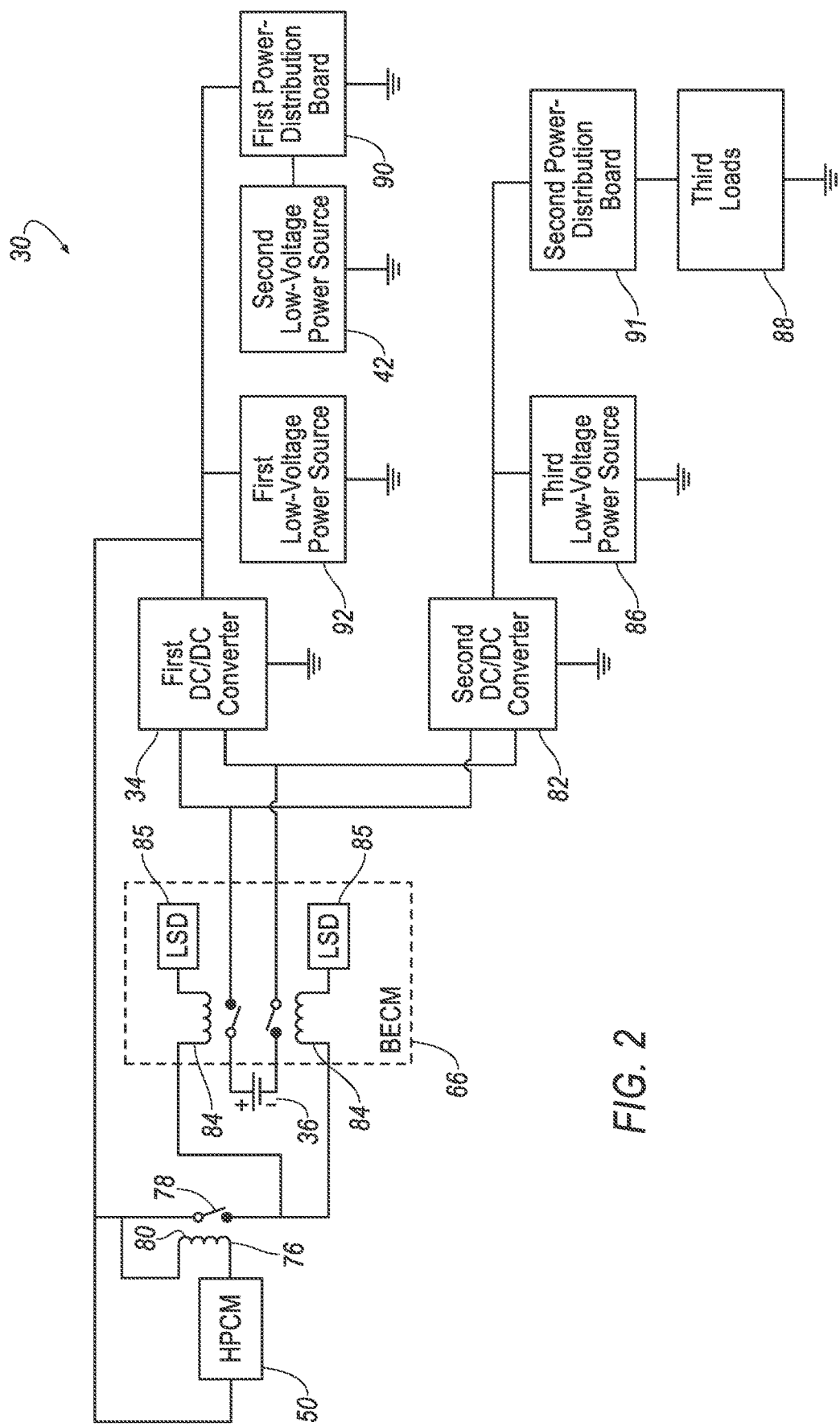
FIG. 2 is a circuit diagram of an example electrical system of the vehicle of FIG. 1.
Figure 3:
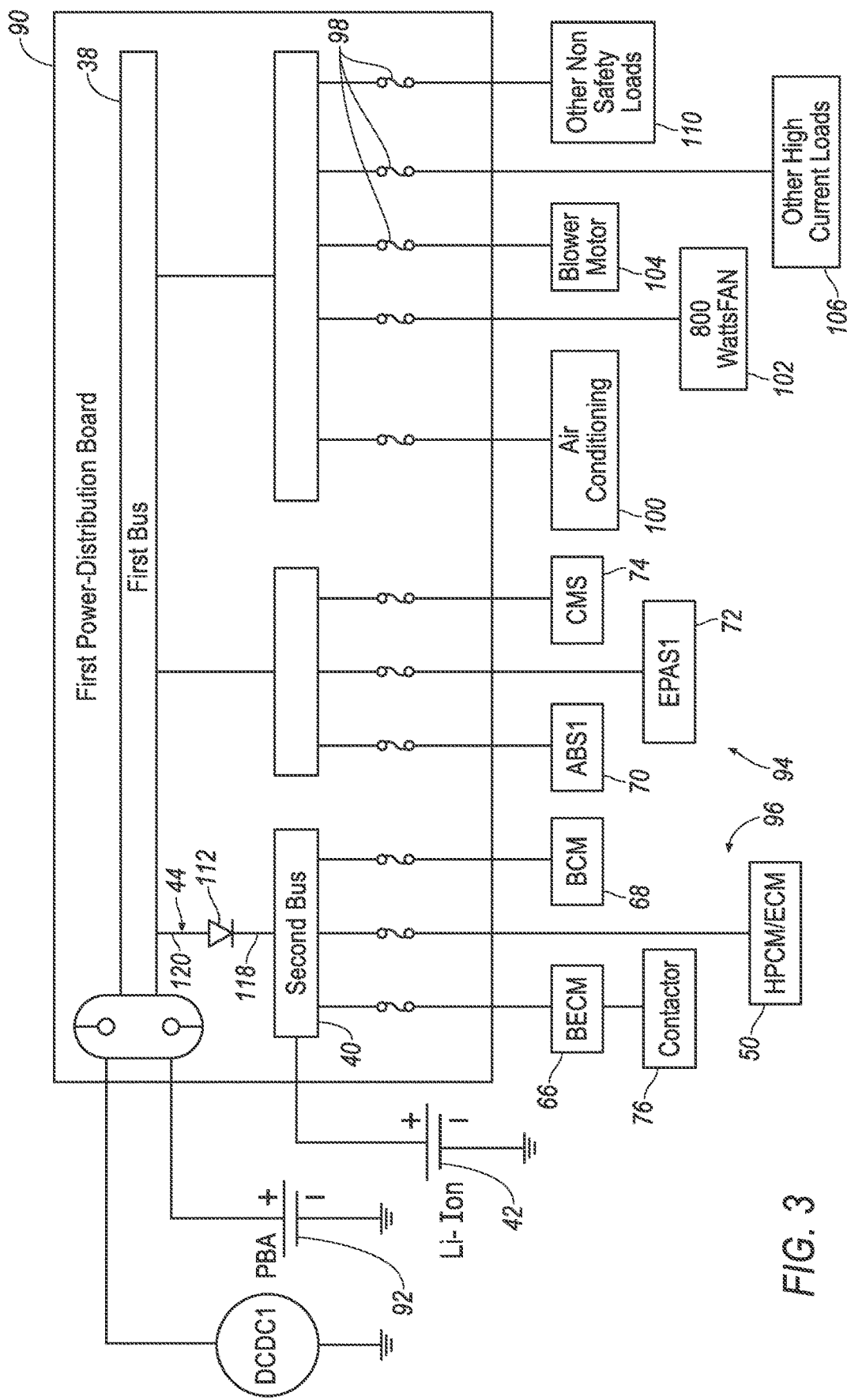
FIG. 3 is a circuit diagram of an example power-distribution system of the electrical system of FIG. 2.
Figure 4:
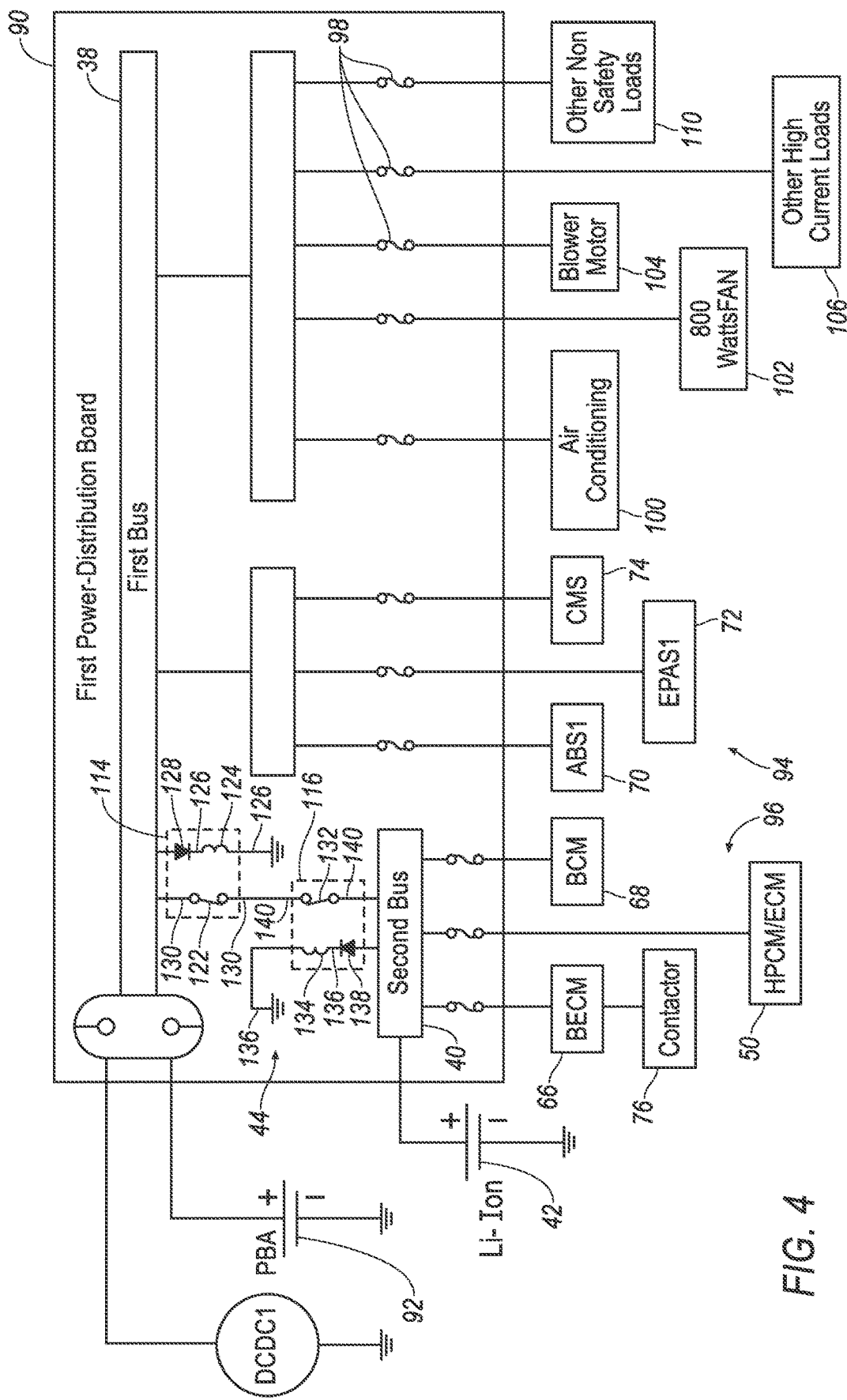
FIG. 4 is a circuit diagram of another example power-distribution system of the electrical system of FIG. 2.

With reference to FIGS. 2-4, the vehicle 32 includes a plurality of control modules 50, 66, 68, 70, 72, 74. The control modules 50, 66, 68, 70, 72, 74 may include the hybrid-powertrain control module 50, a battery-energy control module 66, a body control module 68, an antilock brake control module 70, a first power-steering control module 72, and a collision-mitigation-system control module 74, as shown in FIGS. 3 and 4. The control modules 50, 66, 68, 70, 72, 74 may be microprocessor-based computers. Each control module 50, 66, 68, 70, 72, 74 includes memory, at least one processor, etc. The memories of the control modules 50, 66, 68, 70, 72, 74 include memory for storing instructions executable by the processors as well as for electronically storing data and/or databases.

With reference to FIG. 2, a contactor 76 is positioned to control the supply of electricity from the high-voltage power source 36 to the first DC/DC converter 34 and a second DC/DC converter 82. The contactor 76 is an electrically controlled switch. The contactor 76 includes a switch 78 and a coil 80, or electromagnet, for controlling the switch 78. Alternatively, the contactor 76 may include a solid-state circuit for controlling the switch 78. The contactor 76 may be normally open; i.e., the switch 78 is open when current is not flowing through the coil 80 or solid-state circuit.

The contactor 76 may be operated by, e.g., the hybrid-powertrain control module 50 and/or the battery-energy control module 66; in other words, the hybrid-powertrain control module 50 and/or the battery-energy control module 66 may transmit current through the coil 80 or solid-state circuit to close the switch 78 of the contactor 76. The hybrid-powertrain control module 50 and/or the battery-energy control module 66 may be programmed to operate the contactor 76, e.g., conditions for opening and closing the contactor 76.

For example, the hybrid-powertrain control module 50 may operate the contactor 76, and the battery-energy control module 66 may include two BECM relays 84 controlled by the contactor 76. Each BECM relay may supply current from the high-voltage power source 36 to one of the first DC/DC converter 34 and the second DC/DC converter 82 when closed. The BECM relays 84 may be electrically controlled switches, e.g., by a coil or solid-state circuit. The BECM relays 84 may be normally open. The contactor 76 may be connected to supply current to the coil or solid-state circuit of the BECM relays 84 when closed. When the contactor 76 is closed, current flows from the contactor 76 through the coil or solid-state circuit of the BECM relays 84 to low-side drivers 85, closing the BECM relays 84 and supplying current from the high-voltage power source 36 to the DC/DC converters 34, 82.

The first DC/DC converter 34 is positioned to receive current from the high-voltage power source 36 and deliver current to a first power-distribution board 90, specifically, to the first bus 38 (as shown in FIGS. 3 and 4). The second DC/DC converter 82 is positioned to receive current from the high-voltage power source 36 and deliver current to a third low-voltage power source 86 and a second power-distribution board 91, which distributes the current to third loads 88. The DC/DC converters 34, 82 may receive high-voltage direct current from the charger/inverter 64 and/or the high-voltage power source 36 and convert the high-voltage direct current to low-voltage direct current. For the purposes of this disclosure, "low voltage" is defined as less than 60 volts direct current or less than 30 volts alternating current. For example, the low-voltage direct current may be 12 volts or 48 volts. The first DC/DC converter 34 may exchange the low-voltage direct current with a first low-voltage power source 92, and the first DC/DC converter 34 may supply the low-voltage direct current to the first bus 38.

With reference to FIGS. 3 and 4, the first power-distribution board 90 divides current into subsidiary circuits, i.e., a plurality of loads 94, 96. The first power-distribution board 90 includes the first bus 38, the second bus 40, and one or more fuses 98. The loads 94, 96 include first loads 94 electrically connected to the first bus 38 and second loads 96 electrically connected to the second bus 40. Current from the first DC/DC converter 34 and/or from the first low-voltage power source 92 flows to the first bus 38 and then either to the second bus 40 via the isolation circuit 44 or to the first loads 94. Current flows from the second bus 40 to the second loads 96. The first loads 94 may include the antilock brake control module 70, the first power-steering control module 72, the collision-mitigation-system control module 74, an air-conditioning system 100, a fan 102 for cooling the engine 52, a blower motor 104, other high-current loads 106, and other nonsafety loads 110. The high-current loads 106 are defined for the purposes of this disclosure as loads with a fuse rating above 30 amperes. The second loads 96 may include the battery-energy control module 66, the hybrid-powertrain control module 50, the body control module 68, and the contactor 76.

The low-voltage power sources 42, 86, 92 each produces a voltage less than 60 volts direct current, e.g., 12 or 48 volts direct current. The low-voltage power sources 42, 86, 92 may be any type suitable for providing low-voltage electricity for power the loads 88, 94, 96, e.g., batteries such as lithium-ion or lead-acid, capacitors, etc. For example, as shown in FIGS. 3 and 4, the first low-voltage power source 92 is a lead-acid battery, and the second low-voltage power source 42 is a lithium-ion battery. The first low-voltage power source 92 is electrically connected to the first bus 38, and the second low-voltage power source 42 is electrically connected to the second bus 40.

In normal operation, i.e., the electrical system 30 has not experienced any short circuits, the first and second loads 94, 96 are typically powered via the first DC/DC converter 34 without drawing power from the first low-voltage power source 92. The first low-voltage power source 92 can supply power in the event of transient demands from the first and second loads 94, 96 for greater power than the first DC/DC converter 34 can supply.

With continued reference to FIGS. 3 and 4, the isolation circuit 44 is electrically connected to the first and second buses 38, 40. The isolation circuit 44 permits current to flow in only one direction from the first bus 38 to the second bus 40. Current cannot flow through the isolation circuit 44 from the second bus 40 to the first bus 38. The isolation circuit 44 isolates the second bus 40 from the first bus 38 in response to the first bus 38 short-circuiting. For example, as shown in FIG. 3, the isolation circuit 44 may be a diode 112. For another example, as shown in FIG. 4, the isolation circuit 44 may include a first switch 114 configured to open, e.g., as described in more detail below, when the first bus 38 is short-circuited. For another example, the isolation circuit 44 may include a controller (not shown) programmed to, in response to receiving data indicating that the first bus 38 is short-circuited, instruct a switch connecting the first and second buses 38, 40 to open.

If the first bus 38 short-circuits and the isolation circuit 44 isolates the second bus 40 from the first bus 38, then current from the second low-voltage power source 42 flows through the second bus 40 to the second loads 96. The hybrid-powertrain control module 50, the battery-energy control module 66, and the contactor 76 are thus able to continue operating even when the first bus 38 short-circuits. Because the contactor 76 continues to operate, the high-voltage power source 36 can still supply power to the second DC/DC converter 82.

The isolation circuit 44 may also isolate the second bus 40 from the first bus 38 in response to the second bus 40 short-circuiting. For example, as shown in FIG. 4, the isolation circuit 44 may include a second switch 116 configured to open when the second bus 40 is short-circuited. For another example, the isolation circuit 44 may include a controller (not shown) programmed to, in response to receiving data indicating that the second bus 40 is short-circuited, instruct a switch connecting the first and second buses 38, 40 to open.

If the second bus 40 short-circuits and the isolation circuit 44 isolates the second bus 40 from the first bus 38, the first bus 38 is still able to support the first loads 94 with current from the first DC/DC converter 34 and/or the first low-voltage power source 92.

With reference to FIG. 3, the isolation circuit 44 may include the diode 112. For example, the isolation circuit 44 may be the diode 112. The diode 112 includes a cathode 118 and an anode 120. For the purposes of this disclosure, a "diode" is defined as a two-terminal electrical component that conducts current primarily in one direction from the anode to the cathode. For example, the diode 112 may have very low resistance in the direction from the anode 120 to the cathode 118 and very high resistance in the direction from the cathode 118 to the anode 120. The diode 112 may be any suitable type, e.g., point-contact diode, solid-state diode, semiconductor diode, etc. The anode 120 is electrically connected to the first bus 38. The cathode 118 is electrically connected to the second bus 40. Current can thus flow from the first bus 38 to the second bus 40 but not from the second bus 40 to the first bus 38; therefore, if the first bus 38 short-circuits, current does not flow from the first bus 38 to the second bus 40 despite the second bus 40 being at a higher voltage than the first bus 38.

With reference to FIG. 4, the isolation circuit 44 may include the first switch 114 and the second switch 116. The first switch 114 is configured to open when the first bus 38 is short-circuited. For example, the first switch 114 may be a first relay, i.e., an electrically controlled switch. The first switch 114 includes a switch 122 and a coil 124, or electromagnet, for controlling the switch 122. Alternatively, the first switch 114 may include a solid-state circuit for controlling the switch 122. The first switch 114 may be normally open, i.e., open when current is not flowing through the coil 124 or solid-state circuit, or normally closed, i.e., closed when current is not flowing through the coil 124 or solid-state circuit. As shown in FIG. 4, the first switch 114 is normally open.

The first switch 114 may include a control lead 126 electrically connected to the first bus 38 and a control lead 126 electrically connected to ground. For the purposes of this disclosure, a "control lead" is defined as a lead from the coil or solid-state circuit of a relay. The control lead 126 may be electrically connected to the first bus 38 via a first diode 128. The first diode 128 may be arranged to permit current to flow from but not to the first bus 38, i.e., with the anode electrically connected to the first bus 38 and the cathode to the control lead 126. The first switch 114 may include a switch lead 130 electrically connected to the first bus 38 and a switch lead 130 electrically connected to the second bus 40 via the second switch 116. For the purposes of this disclosure, a "switch lead" is defined as a lead from the switch of a relay.

When the first bus 38 has a positive voltage, i.e., is not short-circuited, current flows through the first diode 128 and coil 124 to ground. The current flowing through the coil 124 causes the switch 122 of the first switch 114 to remain closed, so current can flow through the switch 122 from the first bus 38 to the second bus 40. When the first bus 38 short-circuits, the amount of current flowing through the first diode 128 and the coil 124 is zero or negligibly close to zero. With no current flowing through the coil 124, the switch 122 opens, preventing current from flowing between the first bus 38 and the second bus 40.

The second switch 116 is configured to open when the second bus 40 is short-circuited. For example, the second switch 116 may be a second relay, i.e., an electrically controlled switch. The second switch 116 includes a switch 132 and a coil 134, or electromagnet, for controlling the switch 132. Alternatively, the second switch 116 may include a solid-state circuit for controlling the switch 132. The second switch 116 may be normally open, i.e., open when current is not flowing through the coil 134 or solid-state circuit, or normally closed, i.e., closed when current is not flowing through the coil 134 or solid-state circuit.

The second switch 116 may include a control lead 136 electrically connected to the second bus 40 and a control lead 136 electrically connected to ground. The control lead 136 may be electrically connected to the second bus 40 via a second diode 138. The second diode 138 may be arranged to permit current to flow from but not to the second bus 40, i.e., with the anode electrically connected to the second bus 40 and the cathode to the control lead 136. The second switch 116 may include a switch lead 140 electrically connected to the second bus 40 and a switch lead 140 electrically connected to the first bus 38 via the first switch 114. In other words, the first switch 114 and the second switch 116 are arranged in series. Both the first switch 114 and the second switch 116 must be closed for current to flow between the first bus 38 and the second bus 40.

When the second bus 40 has a positive voltage, i.e., is not short-circuited, current flows through the second diode 138 and coil 134 to ground. The current flowing through the coil 134 causes the switch 132 of the second switch 116 to remain closed, so current can flow through the switch 132 from the first bus 38 to the second bus 40. When the second bus 40 short-circuits, the amount of current flowing through the second diode 138 and the coil 134 is zero or negligibly close to zero. With no current flowing through the coil 134, the switch 132 opens, preventing current from flowing between the first bus 38 and the second bus 40.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An electrical system for a vehicle comprising:
   a DC/DC converter electrically connected to a high-voltage power source and a first bus;
   a second bus electrically connected to a low-voltage power source; and
   an isolation circuit electrically connected to the first and second buses, the isolation circuit permitting current flow in only one direction from the first bus to the second bus;
   wherein the isolation circuit includes a first switch electrically connecting the first and second buses;
   the isolation circuit includes a second switch electrically connecting the first and second buses:
   the first switch is configured to open when the first bus is short-circuited; and
   the second switch is configured to open when the first bus is short-circuited.

2. The electrical system of claim 1, wherein the first switch is a relay including a control lead electrically connected to the one of the first and second buses.

3. The electrical system of claim 2, further comprising a diode electrically connecting the control lead and the one of the first and second buses.

4. The electrical system of claim 1, wherein the first switch is a first relay including a first control lead electrically connected to the first bus, and the second switch is a second relay including a second control lead electrically connected to the second bus.

5. The electrical system of claim 4, further comprising a first diode electrically connecting the first control lead and the first bus, and a second diode electrically connecting the second control lead and the second bus.

6. The electrical system of claim 1, wherein the first and second switches are arranged in series between the first and second buses.

7. The electrical system of claim 1, wherein the low-voltage power source is a second low-voltage power source, the electrical system further comprising a first low-voltage power source electrically connected to the first bus.

8. The electrical system of claim 1, further comprising a plurality of loads electrically connected to the first bus.

9. The electrical system of claim 8, wherein the loads are not electrically connected to the second bus.

10. The electrical system of claim 8, wherein the loads include an air-conditioning system.

11. The electrical system of claim 10, wherein the powertrain is a hybrid powertrain.

12. The electrical system of claim 1, further comprising a plurality of loads electrically connected to the second bus.

13. The electrical system of claim 12, wherein the loads include a contactor for the high-voltage power source.

14. The electrical system of claim 13, wherein the contactor electrically connects the high-voltage power source to the first bus.

15. The electrical system of claim 14, wherein the loads include a control module programmed to operate the contactor.

16. The electrical system of claim 1, wherein the high-voltage power source is electrically connected to a powertrain of the vehicle.

17. The electrical system of claim 1, wherein the high-voltage power source produces at least 60 volts direct current.

18. The electrical system of claim 1, wherein the low-voltage power source produces less than 60 volts direct current.

* * * * *